United States Patent [19]

Tomes et al.

[11] Patent Number: 5,278,086

[45] Date of Patent: Jan. 11, 1994

[54] MATRIX ADDRESSABLE DISPLAYS

[75] Inventors: Derek W. Tomes, Swindon; Patrick C. Rundle, Ruislip; Antony J. Lowe, Wembley; Stephen A. Haws, Rickmansworth, all of England

[73] Assignee: The General Electric Company, p.l.c., England

[21] Appl. No.: 618,651

[22] Filed: Nov. 27, 1990

[30] Foreign Application Priority Data

Nov. 29, 1989 [GB] United Kingdom ............... 8926960

[51] Int. Cl.$^5$ .......................................... H01L 27/105
[52] U.S. Cl. ........................................ 437/41; 437/50; 359/58; 359/59
[58] Field of Search ......................... 359/58, 59, 60; 340/784; 357/23.7; 437/41, 51, 48, 50

[56] References Cited

U.S. PATENT DOCUMENTS

| 4,514,895 | 5/1985 | Nishimura | 437/16 |
| 4,678,282 | 7/1987 | Yaniv et al. | 359/59 |
| 4,775,861 | 10/1988 | Saito | 359/59 |
| 4,884,875 | 12/1989 | Okumura | 359/58 |
| 4,963,503 | 10/1990 | Aoki et al. | 437/41 |

FOREIGN PATENT DOCUMENTS

| 0075651 | 4/1983 | European Pat. Off. . |
| 0143038 | 5/1985 | European Pat. Off. . |
| 0268380 | 5/1988 | European Pat. Off. . |
| 2593631 | 7/1987 | France . |
| 2593632 | 7/1987 | France . |
| 60-765464 | 9/1985 | Japan ................................ 437/41 |
| 62-65375 | 3/1987 | Japan ................................ 437/41 |
| 2173935 | 10/1986 | United Kingdom . |

Primary Examiner—Olik Chaudhuri
Assistant Examiner—Richard A. Booth
Attorney, Agent, or Firm—Kirschstein, Ottinger, Israel & Schiffmiller

[57] ABSTRACT

In a method of forming a matrix addressable display comprising a group of switchable cells, such as liquid crystal cells, having electrodes on each of two parallel plates and thin-film drive transistors disposed on one of the plates, gate resistors are provided by elongate doped polysilicon regions connecting the gate electrodes to address lines. The gate resistors prevent short-circuiting of the address lines in the event of a gate short-circuit occurring in any of the transistors.

3 Claims, 4 Drawing Sheets

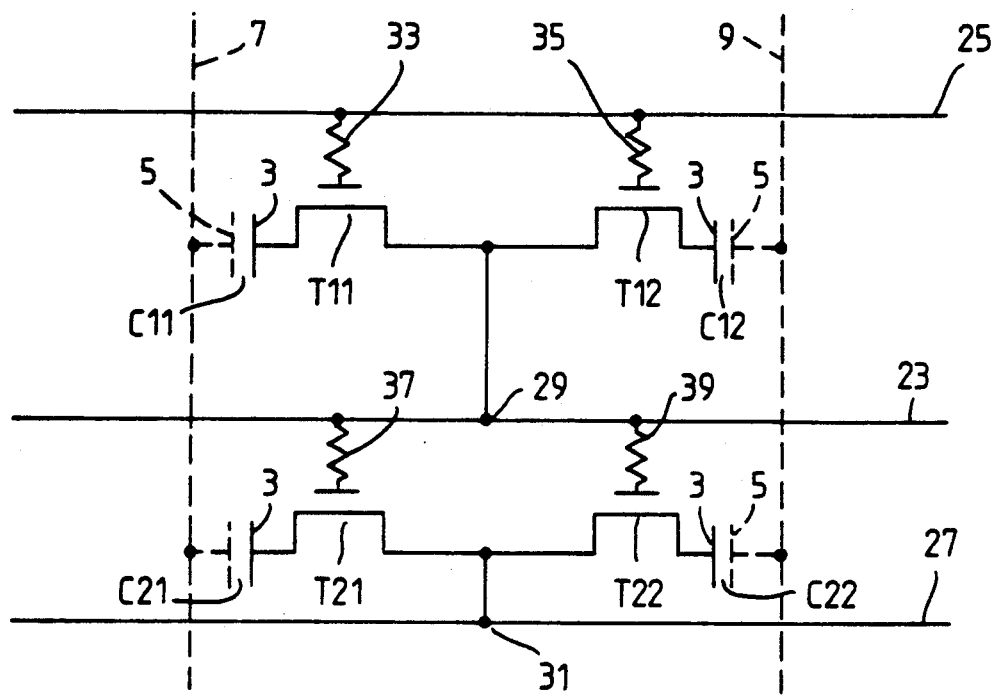
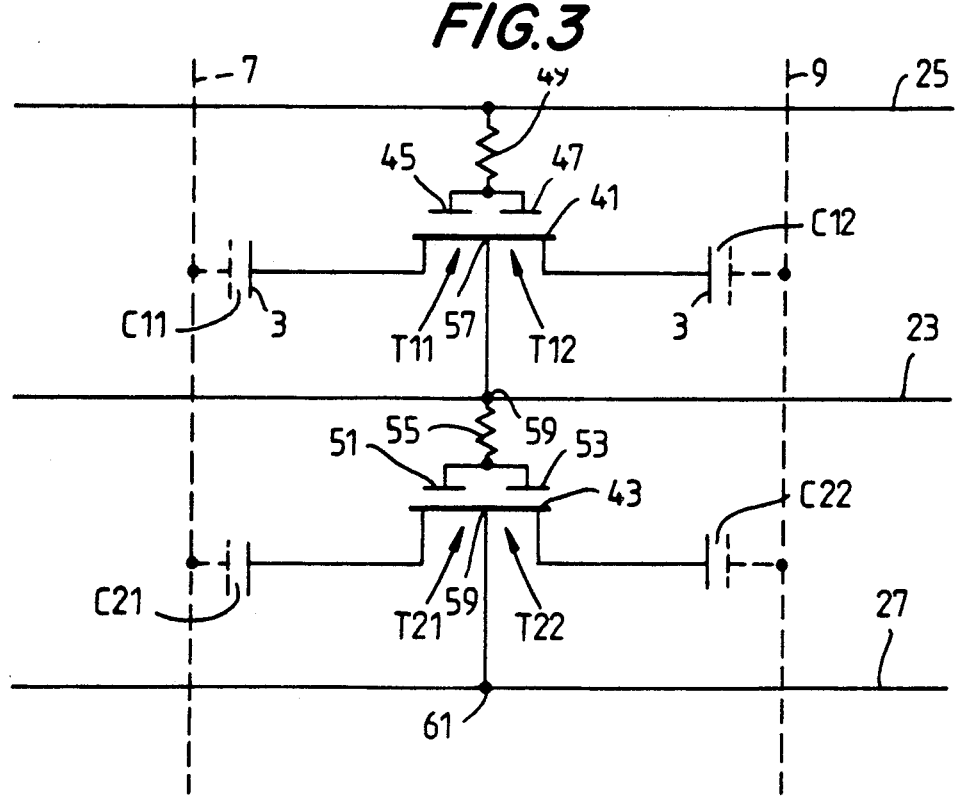

MATRIX ADDRESSABLE DISPLAYS

BACKGROUND OF THE INVENTION

This invention relates to matrix addressable displays. Matrix addressable displays comprising a two dimensional array of switchable cells are known, in which each cell has two electrodes each carried on a surface of a respective one of two plates. Each cell is switchable by means of electric signals applied to a respective pair of address lines connected to the cell. Each of the address lines of a pair is connected to a different plurality of cells within the array.

To overcome the problems of multiplexing the address lines in such a display, i.e. in order to identify uniquely the cell to be switched at any one time and to prevent partial switching of other cells connected to one of the pair of address lines, it is known to connect each cell to its respective pair of address lines via a respective transistor, for example a thin film transistor, i.e. the so-called 'active matrix addressing' approach.

FIG. 1 is a schematic circuit diagram of part of such a known display.

Referring to FIG. 1, the illustrated part of the display comprises an array of liquid crystal cells C11 to C22, each cell being represented in the figure as a capacitor. One electrode 3 of each cell is carried on the inner surface of a transparent first insulating plate, the electrode 3 being the size of a pixel of the display, and being made of a transparent conductor such as indium tin oxide. The other electrode 5 of each cell is defined on the opposing surface of a second insulating plate, this surface carrying a series of parallel conductive column tracks 7, 9, 11. All components carried on this second plate are shown dotted in the figure.

In respect of each cell, there is provided a respective thin film field effect transistor T11 to T22 carried on the first plate. One main electrode of each transistor, hereinafter referred to as a drain for convenience, is connected to the electrode 3 of each cell, whilst the gate of each transistor is connected to a selected gate address line 13, 15, 17 within a series of parallel conductive row tracks on the first plate. The second main electrode of the transistor, hereinafter referred to as the source for convenience, is connected to a reference line which is one of a group of conductive row tracks 19, 21 extending across the first plate parallel to the gate address lines 13, 15, 17. The reference lines may be earthed.

There has been a proposal to combine adjacent reference and gate lines, such as the lines 19 and 15, into a single line, thereby simplifying the manufacturing processes.

In the use of the display, appropriate synchronised gate and source voltage pulses are applied to a selected pair of gate and column address lines. This then selectively addresses the one transistor which is connected to both the selected address lines. The capacitor constituted by the cell connected to the selected transistor is then able to charge up to the voltage required to give a response in the liquid crystal cell. The capacitor is then isolated when the transistor is subsequently switched off, and the charge held on the capacitor is effective to switch the cell in the sense of changing the transmittance of the liquid crystal and thus producing the required pixel image.

However, such a display suffers from the disadvantage that a single-short circuit in a transistor gate results in the failure of the entire row of the display to which the shorted transistor belongs. Even a single row failure is totally unacceptable in a display. Such row failures could be turned into single pixel failures by identifying and disconnecting faulty transistors, single pixel failures being much less noticeable and therefore being tolerable in some applications. This process is, however, time-consuming and expensive, particularly for large numbers of pixels.

In order to overcome this problem, it has been proposed to insert a high-value resistance element in the connection between each transistor and the respective row track, such as indicated by a resistor 23 shown in dotted outline in FIG. 1. However, no indication has previously been given as to how such a resistor is to be formed in a practicable manufacturing process.

SUMMARY OF THE INVENTION

It is an object of the present invention to provide a method of forming a matrix addressable display, and a configuration of such a display, wherein a resistance element is provided in each transistor circuit for limiting the effect of a short-circuit which may occur in the transistor.

According to one aspect of the invention there is provided a method of forming a display of the kind comprising a group of switchable cells disposed between first and second substantially parallel plates, each cell having a first electrode on said first plate and a second electrode on said second plate, in which each of a plurality of transistors disposed on said first plate has two main electrodes and a gate electrode, and in which the main electrodes of each transistor are connected between a respective cell electrode on said first plate and a first address line, and the gate electrode of each transistor is coupled to a second address line; the method comprising forming on said first plate a plurality of polysilicon channel regions for the transistors; insulating the channel regions; forming polysilicon gate regions for the transistors over the channel regions, together with a plurality of elongate polysilicon regions connected to the gate regions; doping the polysilicon gate regions, the channel regions where not masked by the gate regions, and the elongate polysilicon regions whereby said elongate regions form resistance elements; forming said second address line connected to the ends of the polysilicon resistance elements remote from the gate regions, and forming said first electrodes connected to said channel regions.

According to another aspect of the invention there is provided a display comprising a group of switchable cells disposed between first and second substantially parallel plates, each cell having a first electrode on said first plate and a second electrode on said second plate, in which each of a plurality of transistors disposed on said first plate has two main electrodes and a gate electrode, and in which the main electrodes of each transistor are connected between a respective cell electrode on said first plate and a first address line, and the gate electrode of each transistor is coupled to a second address line via a resistance element comprising a strip of doped polysilicon material.

BRIEF DESCRIPTION OF THE DRAWINGS

Each cell is preferably a liquid crystal cell.

An embodiment of the invention will now be described, by way of example, with reference to the accompanying drawings, in which FIG. 2 is a schematic circuit diagram of part of a matrix addressable display in accordance with the invention, FIG. 3 shows a version of the circuit diagram of FIG. 2 wherein the circuit is slightly modified for ease of manufacture, and FIGS. 4 (a)-(f) indicate steps in a method of forming a display in accordance with the invention.

DETAILED DESCRIPTION OF THE PREFERRED EMBODIMENTS

Figure 1:
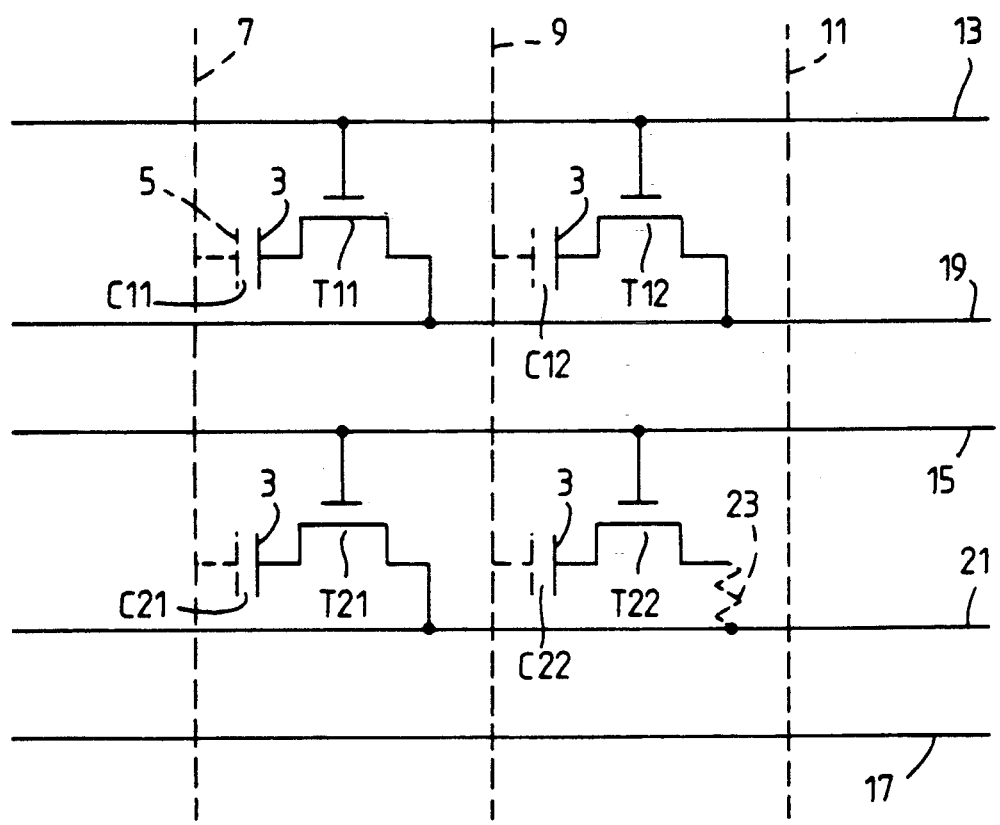
FIG. 1 is a schematic circuit diagram of part of a known matrix addressable display as described above.

Referring to FIG. 2, part of a matrix addressable display is shown, in which components corresponding to those of FIG. 1 have corresponding reference characters. In this case, however, the orientation of the components on the circuit diagram has been changed to conform more closely to that used in a practical manufacturing method according to the invention. As mentioned above, the address lines 19 and 15 have been combined in a single line 23, and address lines 25 and 27 are each similarly common to two adjacent groups of transistors (not shown). The source electrodes of the transistors T11 and T12 are interconnected and are connected to the line 23 at a point 29. Similarly, the source electrodes of the transistors T21 and T22 are connected to the line 27 at a point 31.

The gate electrode of each transistor is connected to the respective address line via a gate resistor 33,35,37,39. In the event of a gate short-circuit occurring in a transistor, the respective gate resistor will act to prevent the address line from also becoming short-circuited.

FIG. 3 shows the circuit diagram of FIG. 2 further modified to illustrate the actual configuration resulting from a practical embodiment of the invention. A single transistor channel 41 is common to the transistors T11 and T12, and a single transistor channel 43 is common to the transistors T21 and T22. Gate electrodes 45 and 47 of the transistors T11 and T12 are interconnected, and are connected to the line 25 via a common gate resistor 49. Similarly, gate electrodes 51 and 53 of the transistors T21 and T22 are interconnected, and are connected to the line 23 via a common gate resistor 55. A common source connection 57 on the channel 41 is connected to the line 23 at a point 59, and a common source connection 61 on the channel 43 is connected to the line 27 at a point 61.

FIG. 4 illustrates steps in the formation of one pair of transistors T11 and T12, associated lines 25 and 23, electrodes 3 of the cells C11 and C12, and gate resistors 33 and 35. It should be noted that the components of all of the other transistors and cells in the display will be formed simultaneously on the same substrate 63, which may be formed of glass.

Firstly, the substrate 63 is covered with a layer of polysilicon, which is then masked and etched to define a polysilicon region 65 (FIG. 4 (a)). This region will form the channel 41. A layer of insulating material, such as silicon dioxide, is deposited over the channel region. Polysilicon regions 67, 69, 71, 73 and 75 (FIG. 4 (b)) are then formed over the insulating layer by a similar process to the region 65. These regions are then doped by ion implantation. At the same time, the channel region 65 is doped by ion implantation, apart from those portions immediately beneath the regions 71 and 73. The device is then annealed at 600° C. The polysilicon regions are then insulated, for example by a layer of silicon dioxide. The ion implantation process is used to effect doping, because the glass substrate cannot withstand high temperature. However, if a quartz substrate were used, the ion implantation could be replaced by high-temperature doping.

Figure 4A:
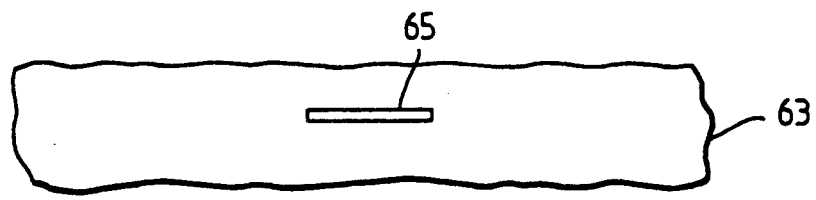
Figure 4B:
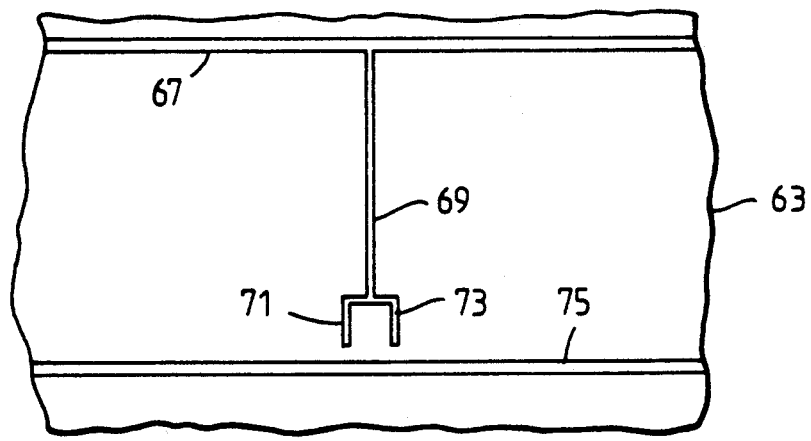
Figure 4C:
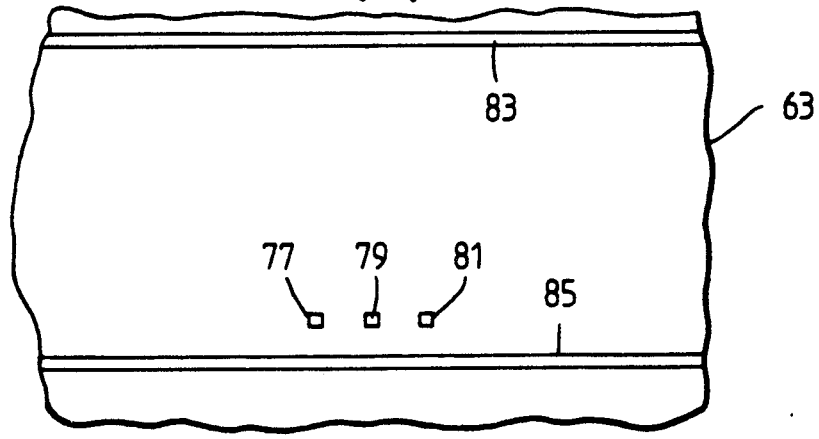
Figure 4D:
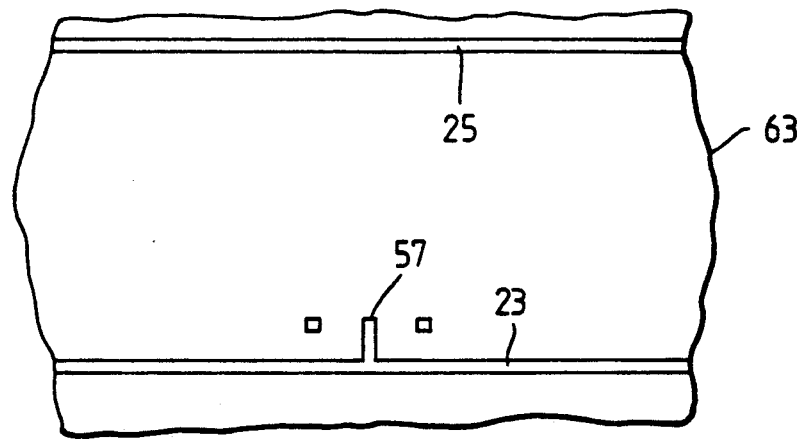

Holes 77, 79, 81 and slots 83, 85 (FIG. 4(c)) are then etched through the insulating layers, so that access is obtained to the region 65 via the holes, and to the regions 67 and 75 via the slots. Aluminium or other conductive material is then deposited through the holes to form the drain and source electrodes of the transistors. At the same time, aluminium is deposited through the slots 83,85 on to the polysilicon regions 67,75 to form the address lines 25 and 23, respectively (FIG. 4(d)).

Figure 4E:
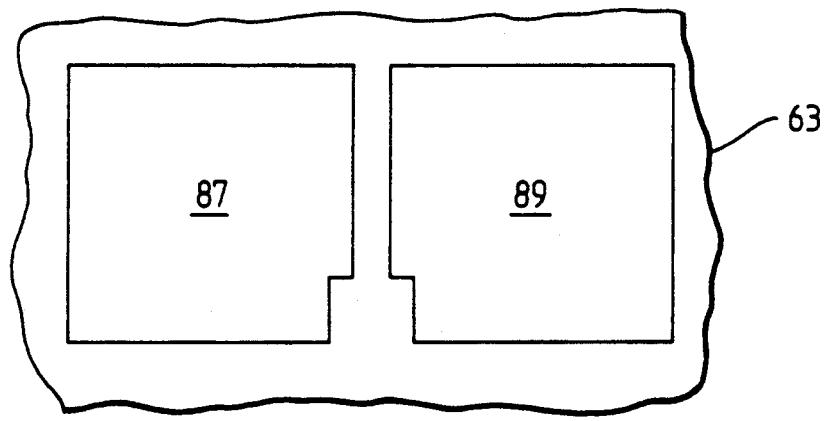
Figure 4F:
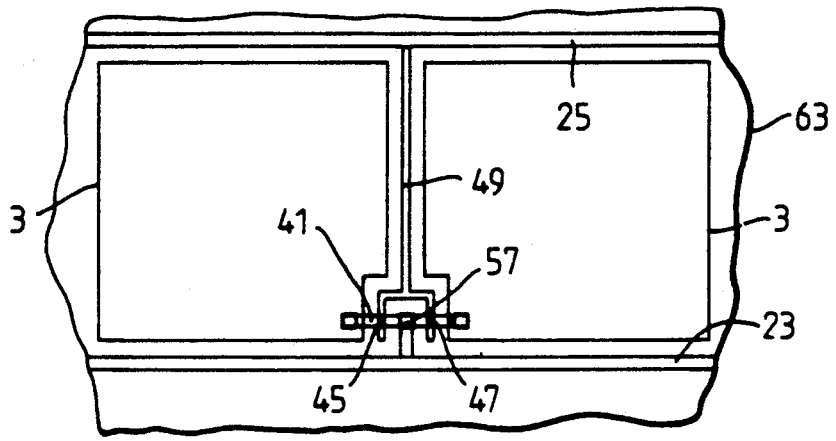

Areas 87,89 (FIG. 4(e)) of transparent conductive material, such as indium tin oxide, are deposited over the insulating layer and connected via the holes 77 and 81 to the drain electrodes. These areas form the electrodes 3 of the cells C11 and C12.

FIG. 4 (f) shows the completed region of the substrate 63, which is then finally annealed at 425° C. The figure shows the same component references as on FIG. 3.

The polysilicon region 69 forms the gate resistor 49. The polysilicon has a sheet resistance of approximately 2000Ω/square, so it is easy to make the gate resistance have any value, such as 100kΩ, by variation of the ratio of width to length of the region 69. The value R of the resistance is preferably chosen so that the RC time constant to charge the gate capacitance C of the transistor is short compared with the gate line address time. This sets an upper limit on R. Since C is small, R can readily be made sufficiently large to prevent address line short-circuiting.

The gate resistor is very easily provided by the polysilicon region during the normal course of making the polysilicon thin film transistors. Furthermore, the use of the polysilicon technology produces a self-aligned transistor by masking of the gate regions in the channel by the overlying gate polysilicon regions 71,73 during doping. This has a considerable advantage in that it reduces crosstalk between adjacent rows and columns of the display.

Self-aligned structures using amorphous silicon processes have previously been proposed, but they rely on photolithography and exposure from the rear of the substrate, and are not ideal for production processes.

We claim:

1. A method of forming a display of the kind comprising a group of switchable cells disposed between first and second substantially parallel plates, each cell having a first electrode on said first plate and a second electrode on said second plate, in which each of a plurality of transistors disposed on said first plate has two main electrodes and a gate electrode, and in which the main electrodes of each transistor are connected between a respective cell electrode on said first plate and a first address line, and the gate electrode of each transistor is coupled to a second address line; the method comprising the steps of: forming on said first plate a plurality of polysilicon channel regions, each channel region providing two of said transistors; insulating the channel regions; forming polysilicon gate regions for the transistors over the channel regions, together with a plurality of elongate polysilicon regions connected to the gate regions; doping the polysilicon gate regions, the channel regions where not masked by the gate regions, and the elongate polysilicon regions whereby said elongate regions form resistance elements; forming said second address line connected to the ends of the polysilicon resistance elements remote from the gate regions, and forming said first electrodes connected to said channel regions.

2. A method as claimed in claim 1, wherein a single said resistance element is common to said two transistors.

3. A method as claimed in claim 1, wherein each cell is a liquid crystal cell.

* * * * *